Figure 1:
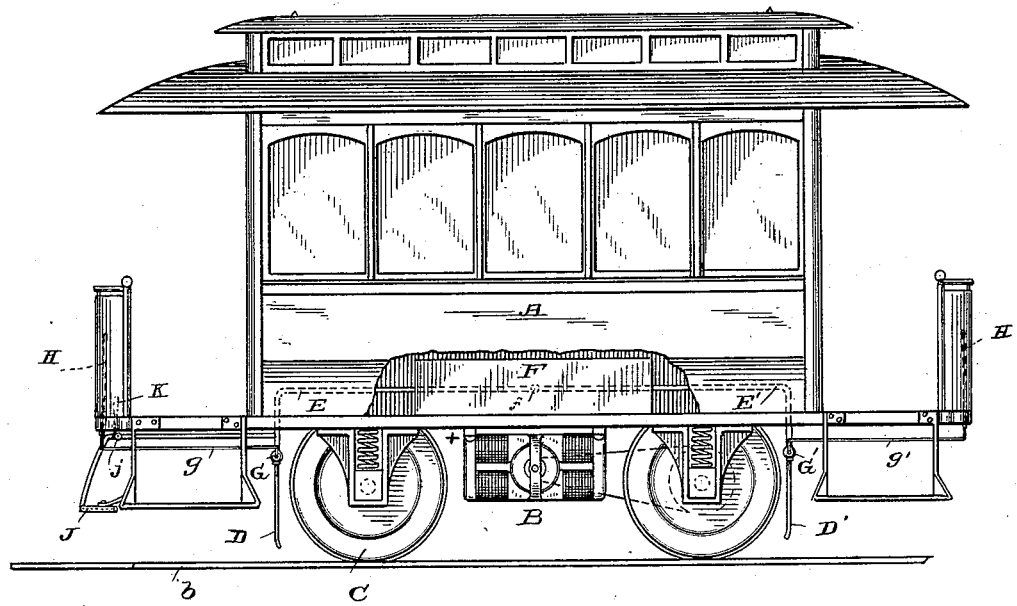

(No Model.)

E. D. PRIEST.
TRACK MOISTENING APPARATUS FOR ELECTRIC RAILWAYS.

No. 404,559. Patented June 4, 1889.

Witnesses,
H. H. Lamb
C. S. Sturtevant

Inventor
Edward D. Priest
By
Frankland James
Attorney.

N. PETERS, Photo-Lithographer, Washington, D. C.

UNITED STATES PATENT OFFICE.

EDWARD D. PRIEST, OF LYNN, MASSACHUSETTS.

TRACK-MOISTENING APPARATUS FOR ELECTRIC RAILWAYS.

SPECIFICATION forming part of Letters Patent No. 404,559, dated June 4, 1889.

Application filed February 18, 1889. Serial No. 300,305. (No model.)

*To all whom it may concern:*

Be it known that I, EDWARD D. PRIEST, a citizen of the United States, residing at Lynn, in the county of Essex and State of Massachusetts, have invented certain new and useful Improvements in Track-Moistening Apparatus for Electric Railways, of which the following is a description, reference being had to the accompanying drawings, and to the letters and figures of reference marked thereon.

My invention relates to electric railways of the class in which one or both rails of the track are electrically connected and included in the return-circuit, the connections between the said track and the motor being through suitable metallic parts on the car and one or more of the carrying-wheels thereof.

In the operation of electric railways of the class designated it frequently happens that in dry weather or where the track becomes covered with dust or dirt such material will be interposed between the carrying-wheels of the vehicle and the track in such quantities as to prevent good metallic contact between the wheels and the track. While not seriously affecting the adhesion of the wheels and track, such substances when dry possess high insulating properties and serve to create a large and wasteful resistance in the return-circuit, thereby materially affecting the operation of a motor, particularly when the same is connected in parallel between the supply-conductor and the rails as a return-circuit.

My invention consist in means for overcoming or diminishing the obstruction referred to; and it consists in an arrangement to be carried by the motor-car, whereby I am enabled to moisten or wet the track sufficiently to insure good electrical connection between it and the wheels of the vehicle.

It is usual to provide an electric motor-car with brushes or other means for cleaning the track; but in many instances this precaution is not sufficient to accomplish the desired ends which I find to be secured by my invention. The liquid used may be acidulated water or water without any admixture, the object being to either wash off or saturate the foreign substances upon the track, so that a practically good electrical connection may be made by the carrying-wheels of the vehicle under all conditions. The location of the tank and supply-pipes is not material, since they may be located in any convenient position; but in the accompanying drawings I have illustrated a convenient arrangement for carrying out my said invention, which, together with the various details thereof, will be hereinafter fully set forth, and referred to in the appended claims.

Figure 2:
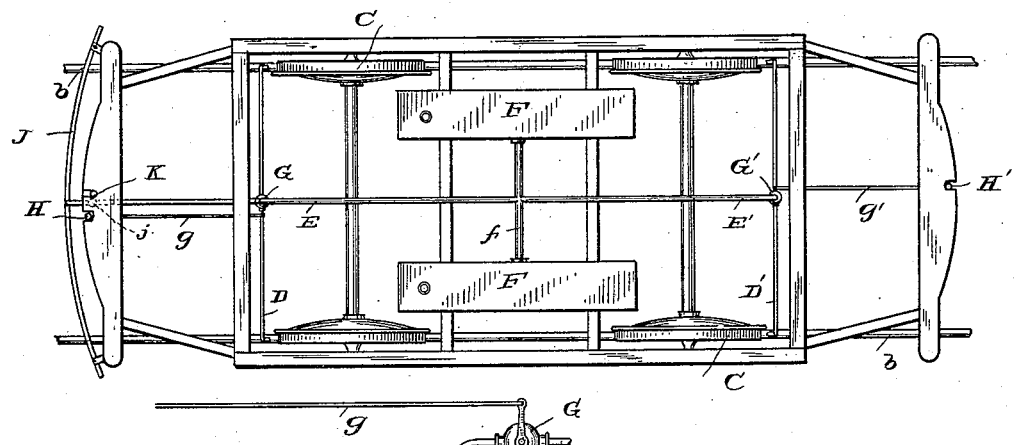
Figure 3:
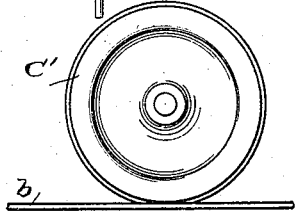

Figure 1 is a side elevation, partly in section, showing a motor-car to which my invention is applied. Fig. 2 is a plan view thereof. Fig. 3 shows a somewhat different manner of applying the invention.

As indicated in the drawings, A is a car of any desired type, which is arranged to be propelled by a motor B, receiving current from any desired source of supply which is in electrical connection by conductor 1 with the positive pole of the motor B. The other pole of the motor B is connected, as by conductor 2, with the wheel or wheels C, by which the car A is carried upon the rails *b*. The rails *b* are electrically connected in any desired manner, and form the return side of the supply-circuit, the motor being thus in multiple arc between the supply-conductor and the rails.

In order to moisten the track and thereby increase or establish the electrical connection between the wheels C and the said track *b* during dry weather, when dirt or sand may have drifted or otherwise accumulated upon the rails, I provide wetting-nozzles D, which are arranged above the track and in juxtaposition to the wheels of the car. Two sets of nozzles D D' may be provided, one in advance of each pair of wheels, so that one set may be shut off and the other used according to the direction of movement of the car.

E E' are pipes connecting the nozzles D D' with tank F, in which is placed a supply of liquid — desirably water treated with a substance that will increase its conductivity, although plain water may also be used. A tank may be placed under the seats of the car, as indicated in Fig. 1, or upon the roof, or in any other convenient position, and be provided with connections for attachment to an ordinary hydrant. As shown, two tanks are provided, one on each side of the cut, to equally distribute the weight, and said tanks are connected by a pipe $f$, from which lead the distributing-pipes D D'. Controlling-valves G G' are also provided, said valves being placed in convenient positions in the distributing-pipes and provided with connections $g$ $g'$ and operating-levers H H', whereby they may be operated from either platform of the car, as desired.

It will be obvious that any means for increasing the conductivity of the wheels and track, by lessening the resistance between them through the aid of moisture applied as desired, is within the scope of my invention, and it will be understood that it is immaterial whether the moistening-liquid be applied to the track or to the wheels, since the electrical effect in both instances should be the same.

In Fig. 3 a nozzle $G^3$ is seen in position to apply liquid to the periphery of the wheel C', from which point it will run down upon the track. This arrangement may in some instances be found preferable.

So far as the main feature of my invention is concerned, it is immaterial where the tank or tanks be located, or what the nature of the connection between the source of supply and the distributing-nozzles. I have, however, illustrated specific devices, but do not limit myself to the precise details shown and described, as various changes and modifications thereof may easily be made without in any manner departing from the spirit or scope of the invention.

I do not limit my invention to merely moistening the tracks of an electric railway, since it is frequently desirable to moisten not only the track, but the surrounding parts of the roadway, in order to lay the dust and prevent dirt and loose material from being blown onto the track. By laying the dust upon the line of travel of the car travel will be rendered much less disagreeable in dry windy weather, and the dust washed from the track by the nozzles D will be prevented from returning.

Water may be applied to the sprinkling of the roadway in various ways; but as here shown, a sprinkling device J is attached to one end of the car and connected with the supply-tanks by pipe $g$, in which is placed a stop-cock $j$, the lever of which extends upward through the platform of the car, so as to be readily accessible.

I have for convenience of illustration shown a sprinkling device at one end of the car only; but it will be apparent that it may be applied to either or both ends, as desired.

Having described my invention, what I claim, and desire to secure by Letters Patent, is—

1. In an electric railway in which the rails form part of the supply-circuit, means for decreasing the resistance between the wheel or wheels and said track, comprising apparatus for supplying a moistening-liquid to the track, or to the wheels and track, substantially as described.

2. In electric railways, the combination, with a motor-car, of a tank for carrying a supply of liquid, connections extending from said tank to a point near the rail or rails of the track, and valves for controlling the flow of liquid from the tank, substantially as described.

3. In electric railways, the combination, with a motor-car, of a tank for carrying a supply of liquid, connections extending from the supply-tank to a point near the rail or rails of the track, valves for controlling the flow of liquid from the tank, and connections for operating the valves, substantially as described.

4. In electric railways, the combination, with a motor-car, of a tank for carrying a supply of liquid, separate distributing-pipes and connections extending from the supply-tank to points in advance of the wheels of the car, valves for controlling the flow of liquid in both sets of pipes, and means for opening and closing, and thereby permitting the liquid to flow from the tank through either of the sets of distributing-pipes as desired, substantially as described.

5. In electric railways, the combination, with a motor-car, of a tank for carrying a supply of liquid, distributing-pipes and connections extending from the supply-tank to points adjacent to the track and roadway, valves for controlling the flow of liquid in the several sets of pipes, and means for opening and closing the valves, substantially as described.

In testimony whereof I hereto affix my signature in presence of two witnesses.

EDWARD D. PRIEST.

Witnesses:
Wm. D. Pool,
M. Hallaran.